US012761840B2

(12) United States Patent
Morales et al.

(10) Patent No.: US 12,761,840 B2
(45) Date of Patent: Oct. 13, 2026

(54) PRINTING SYSTEM AND METHODS FOR DYNAMICALLY CONFIGURED CONFLICT CHECKING IN PRINTING OPERATIONS

(71) Applicant: Kyocera Document Solutions Inc., Osaka (JP)

(72) Inventors: Javier A. Morales, Rochester, NY (US); Katherine Bayquen Lao, Pacheco, CA (US)

(73) Assignee: Kyocera Document Solutions Inc., Osaka (JP)

( * ) Notice: Subject to any disclaimer, the term of this patent is extended or adjusted under 35 U.S.C. 154(b) by 269 days.

(21) Appl. No.: 18/219,358

(22) Filed: Jul. 7, 2023

(65) Prior Publication Data

US 2025/0013398 A1 Jan. 9, 2025

(51) Int. Cl.
*G06F 3/12* (2006.01)

(52) U.S. Cl.
CPC ............ *G06F 3/121* (2013.01); *G06F 3/1234* (2013.01)

(58) Field of Classification Search
CPC ...... G06F 3/121; G06F 3/1234; G06F 3/1204; G06F 3/1205; G06F 3/1255; G06F 3/1285
See application file for complete search history.

(56) References Cited

U.S. PATENT DOCUMENTS

2006/0290961 A1* 12/2006 Low ...................... G06F 3/1282 358/1.9
2008/0143738 A1* 6/2008 Woolfe ................ H04N 1/6011 345/597
2012/0281251 A1* 11/2012 Salgado ................ G06F 3/1204 358/1.15
2018/0189617 A1* 7/2018 Feng ...................... G06K 15/16
2020/0310701 A1* 10/2020 Kai ......................... G06F 3/123
2022/0308803 A1* 9/2022 Hasama ................ G06F 3/1258

* cited by examiner

*Primary Examiner* — John R Wallace
(74) *Attorney, Agent, or Firm* — Millen, White, Zelano & Branigan P.C.; William F. Nixon

(57) ABSTRACT

A printing system includes a printing device having a digital front end (DFE). The DFE includes printing device configuration settings. The DFE defines the settings based on configurable attributes and generates a device capabilities file. The device capabilities file is downloaded to a print driver, printing application, or other interface. The settings within the device capabilities file are modified based on a conflict with a configurable attribute received from another set of attributes. The modified settings are stored within the device capabilities file. The device capabilities file is provided to a print ticket editor or similar device with the settings dynamically configured.

13 Claims, 13 Drawing Sheets

502 504 506 508 510 512

| Media Type | Front/Back Coating Detail | Texture | Hole Type | Set Count |
|---|---|---|---|---|
| Stationery | Inkjet | Smooth | | |
| Card Stock | Inkjet Matte | | | |
| Letterhead | None | Uncalendared | | |
| | | Antique | | |
| | | Linen | | |
| | | Stipple | | |
| | | Vellum | | |
| Full-Cut Tabs | None | Uncalendared | | 1 |
| Pre-Cut Tabs | None | Uncalendared | | |
| Envelope | None | Uncalendared | None | 1 |
| | | Antique | | |
| | | Linen | | |
| | | Stipple | | |
| | | Vellum | | |
| Labels | None | | None | 1 |

FIG. 5

PRINTING SYSTEM AND METHODS FOR DYNAMICALLY CONFIGURED CONFLICT CHECKING IN PRINTING OPERATIONS

FIELD OF THE INVENTION

The present invention relates to a printing system and associated methods to conduct conflict checks in printing operations. More particularly, the present invention relates to enabling dynamically configured conflict checking for print settings.

DESCRIPTION OF THE RELATED ART

Print engines in printing devices support a defined set of print instructions. For example, a printing device may support a specific range of paper weights and sizes. Print engines also may have constraints around combinations of print ticketing values. Finished jobs, for example, only may be delivered to a subset of available trays. Print drivers, print submission utilities and, for digital front ends, the job management user interface all enforce printing ticketing constraints and conflicts between print ticketing settings. The conflicts, however, are hard coded. The conflicts may be adjusted based on the device's configuration. For example, larger paper sizes may be supported by an optional feeder. These adjustments, however, consist of adding or removing conflict checks that are themselves hard coded, or static.

SUMMARY OF THE INVENTION

A method for dynamic conflict checking for printing operations is disclosed. The method includes setting a plurality of configurable attributes relating to printing operations at a digital front end (DFE) of a first printing device. The method also includes defining a first plurality of settings for the first printing device based on the plurality of configurable attributes. The method also includes modifying the first plurality of settings based on a conflict with at least one of the plurality of configurable attributes. The method also includes storing the first plurality of settings in a first device capabilities file. The method also includes providing the first plurality of settings using the first device capabilities file during the printing operations at the first printing device.

A method for resolving conflicts between printing device settings for printing operations. The method includes defining a first setting for printing operations. The first setting corresponds to a plurality of configurable attributes. The method also includes defining a second setting for the printing operations. The second setting is dependent on the first setting and corresponds to a plurality of sub-attributes. The method also includes assigning a first plurality of settings including the first setting and the second setting to a device capabilities file. The method also includes providing the first plurality of settings within the device capabilities file. The method also includes selecting a printing device to receive a first print job to implement the first plurality of settings. The method also includes determining whether the first plurality of settings for the first print job are valid for the printing operations at the first printing device.

A printing system is disclosed. The printing system includes a first printing device, a processor, and a memory storing instructions. The instructions, when executed on the processor, configure the printing system to set a plurality of configurable attributes related to printing operations at the first printing device. The instructions also configure the printing system to define a first plurality of settings for the first printing device based on the plurality of configurable attributes. The instructions also configure the printing system to modify the first plurality of settings based on a conflict with at least one of the plurality of configurable attributes. The instructions also configure the printing system to store the first plurality of settings in a first device capabilities file. The instructions also configure the printing system to provide the first plurality of settings using the first device capabilities file during printing operations at the first printing device.

BRIEF DESCRIPTION OF THE DRAWINGS

Various other features and attendant advantages of the present invention will be more fully appreciated when considered in conjunction with the accompanying drawings.

FIG. 5 illustrates a table of a collection of attributes used in adjusting constraints at the printing device according to the disclosed embodiments.

DETAILED DESCRIPTION OF THE PREFERRED EMBODIMENTS

Figure 1A:
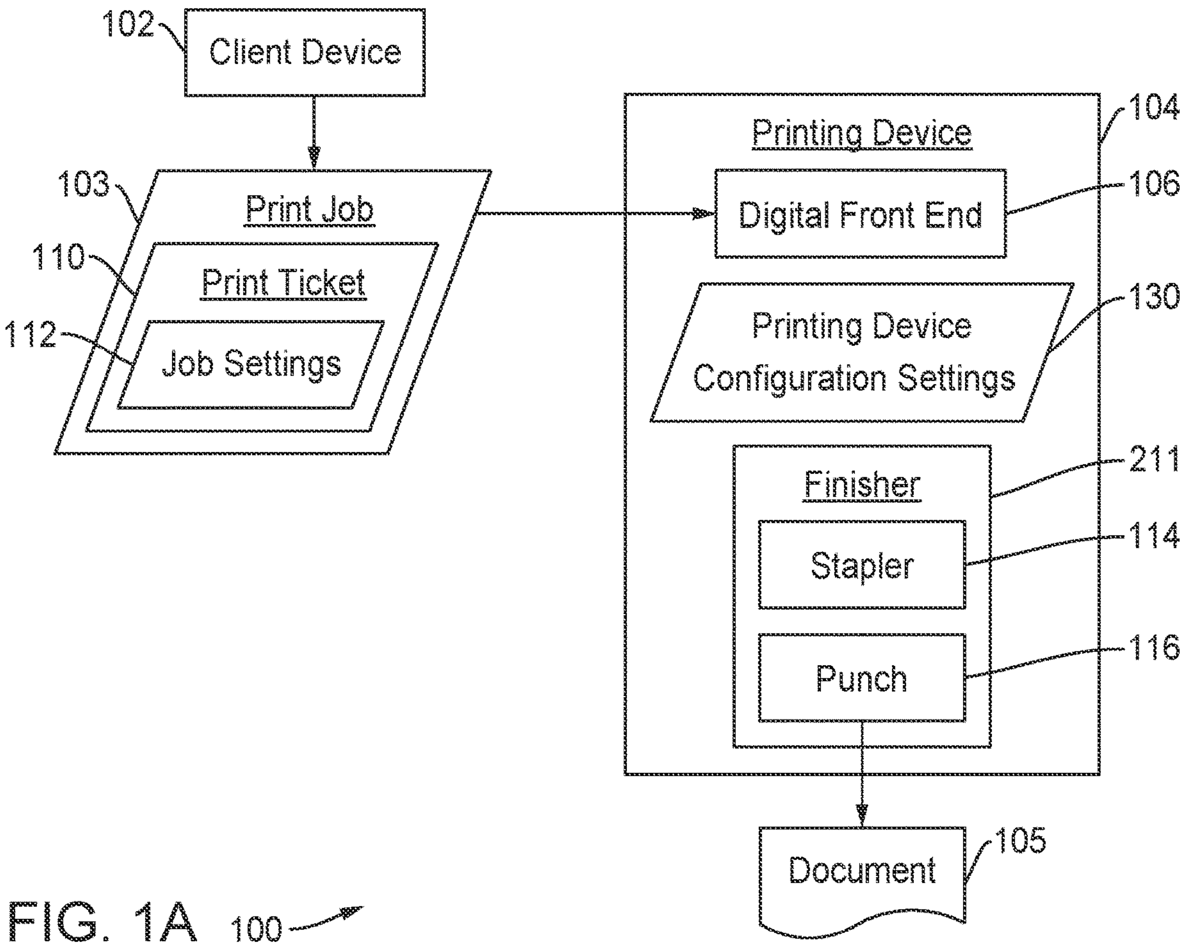
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

Existing conflict checking implementations may not support truly dynamic conflicts. This aspect makes it difficult to implement conflict checking for dynamically configured print settings. Conflict checking for these sort of print tickets would need to support arbitrary, user-defined values for print settings. In addition, the conflict checking would support valid attribute value combinations that are dynamically-defined by the user. The disclosed embodiments provide a printing system to enable conflict checking for print settings with arbitrarily-defined values. The disclosed embodiments also support dynamically-defined attribute value combinations.

The disclosed embodiments may implement a number of different ways to achieve these features depending on the dynamic attributes. Attributes may be configured by an administrator and used by an operator, who cannot change the available values. When the administrator defines the valid settings, the printing system will add these to a device capabilities file that is then used to populate the print ticketing user interface. The user may be presented with valid options based on the dynamically-configured user interface. To the user, the user interface may present a statically-defined set of values. These values, however, are configured uniquely for each system. The attributes are added to the capabilities as part of the configuration.

For attributes that may be configured by a user, such as print condition, the printing system will add new values to the device's capabilities. The user also may remove values in the same manner. Unlike the previous type of attribute, in this instance, the client application, such as the print driver, print submission application, or digital front end (DFE) user interface, must monitor the printing system's capabilities file for changes. When the file changes, the printing system should retrieve it and update its conflict checking with the updated information.

Multi-attribute conflicts would depend on the relevant configuration. In this instance, the user may store settings with a dependency on another setting. The user would define arbitrary values for one attribute in the context of values for another attribute. These contexts would represent the valid combinations that would need to dynamically be added to the conflict checking configuration.

For example, the printing system may store color adjustment presets that can be used to allow the tweaking of a print job's appearance. These presets may be adjustments to how the colors are reproduced. For example, adjustment to the hue or increasing contrast by a certain amount may occur. Several adjustment settings may be stored as a preset for easy recall. These adjustments may be assigned to a customer or a project. The customer or project attributes may be dynamic as disclosed above. The user or administrator defines the valid values for a given system.

For most cases, the adjustment data in the printing system contains the valid combination. For example, customer 1 supports adjustment 1, adjustment 2, and adjustment 3 while customer 2 supports adjustment 2 and adjustment 4. When the user selects attributes, the conflict checking engine evaluates the attributes to ensure that they are a valid combination. If the combination is not valid, then the printing system displays an error to the user. Additionally, if the user defines 1 value and not the other, then the conflict checking engine may be used to subset the values for the second attribute to only show valid values.

The features disclosed above may be extended to support N attributes. For example, a calibration may be associated with N papers or a specific type of media, a specific halftone, and a specific resolution. The disclosed embodiments would work in the same manner as above but the evaluation would involve N attributes. The features disclosed above would extend conflict checking to user-managed resources such as calibrations, spot color definitions, ICC profiles, color adjustments, paper catalogs, and the like. This sort of conflict checking makes using these sort of resources a lot simpler for users as arbitrary, multi-attribute constraints are created and enforced automatically.

The disclosed embodiments also enable adjustments to the dynamic conflict checks based on device configuration. The disclosed embodiments also use multiple severity levels for dynamic conflicts. Specifically, the disclosed embodiments implement a device capabilities file that covers all possible device configurations, including configurations that are mutually exclusive. For example, the feeders and finishers for printing systems or devices may be mutually exclusive.

For example, only one of two feeders and only one of two finishers may be installed on a printing device. These devices have different capabilities and constraints. As such, the different constraints should be reflected in the dynamic conflict checking. The disclosed embodiments provide a system that will list capabilities and conflicts for all modules in a printing device.

During startup, the printing system determines which devices are actually installed with the printing device and adjusts the following items to match the device configuration. These items include available print ticket settings. Available print ticket settings, for example, which includes items like stapling will not be available if the stapler is not installed. The items also include values for print ticket settings. For example, staple options may be limited to corner and side stapling if the booklet maker is not added to the finisher. Additionally, the printing system may adjust the dynamically configured conflicts based on the system configuration. For example, the maximum number of sheets that can be stapled will be based on which finisher option is installed with the printing device.

The disclosed embodiments also implement multiple severity levels for conflicts. The device capabilities would be extended so that they include more than just the inter-attribute conflicts but also severity levels for these inter-attribute conflicts. These severity levels would, in turn, result in different behavior. For example, a conflict may be detected between the number of pages in the print job and the maximum number of sheets that the currently-installed finisher that includes an error severity. If the operator chooses a combination of these attributes which is invalid, the printing system should display an error message next to each of these attributes with information letting the user know that the selected value conflicts with the selected value from the other attribute. The error messages may be for all attributes that conflict with each other. Given the severity of an error conflict, the printing system would prevent the operator from completing the operation, such as submit the job, add a paper catalog entry, reconfigure a tray, and the like, without first resolving the conflict.

A conflict between the selected print order and finishing may have a warning severity. If the operator chooses a combination of attributes that is invalid, then the printing system should display a warning message next to each of the attributes with information letting the operator know how the printing system will handle the conflict. For example, if the operator chooses forward, face down printing and stapling, then the printing system will display a warning icon and provide information to the operator letting him/her know that the print job will print in reverse, face up order as this is required by the finisher.

Conflicts with a warning severity will not prevent the operator from completing the operation but they will let the operator know that the printing system will not honor one of the conflicting settings. Alternatively, the printing system may provide the operator the option to auto-resolve the conflict. For example, in the previous scenario, the printing system may display a "fix conflict" button that the operator can click on to resolve the warning error. If the operator chooses to automatically fix the conflict, then the printing system would, in this example, change the print sequence from forward, face down to reverse, face up. If the operator chooses to submit the print job with the conflict, then the printing system will update the job status to reflect the fact that the job, while successfully completed, had active warnings.

A conflict between the selected paper and the user-defined print condition may have an informational severity. Print conditions are used to allow 1-click selection of alternate color management settings for specific papers in the paper catalog. For example, the operator selects a paper for which a print condition is not specified. In that case, the printing system will fall back to the default color management settings for the paper. Conflicts with an informational severity do not change how the print job is produced but may result in unexpected output so this sort of conflict is considered to be less severe than a warning, in which the printing system overrides operator selections, or an error, in which the printing system will not allow the operation to complete. If the operator chooses to submit the print job with the conflict, then the printing system will update job status to reflect the fact that the print job, while successfully completed, was not produced as specified.

The disclosed printing system may have multiple conflicts active at the same time and these may be of different severities. The printing system may display conflicts separately within a designated area based on their severity.

FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client devices 102.

Printing device 104 receives print jobs through printing system 100, such as print job 103. After processing print job 103, printing device 104 prints or produces document 105 in a paper or media specified by the print job. Printing device 104 is disclosed in greater detail in FIG. 2. Printing device 104 also includes digital front end (DFE) 106, which facilitates processing print job 103. DFE 106 may be disclosed in greater detail in FIG. 1B.

Figure 1B:
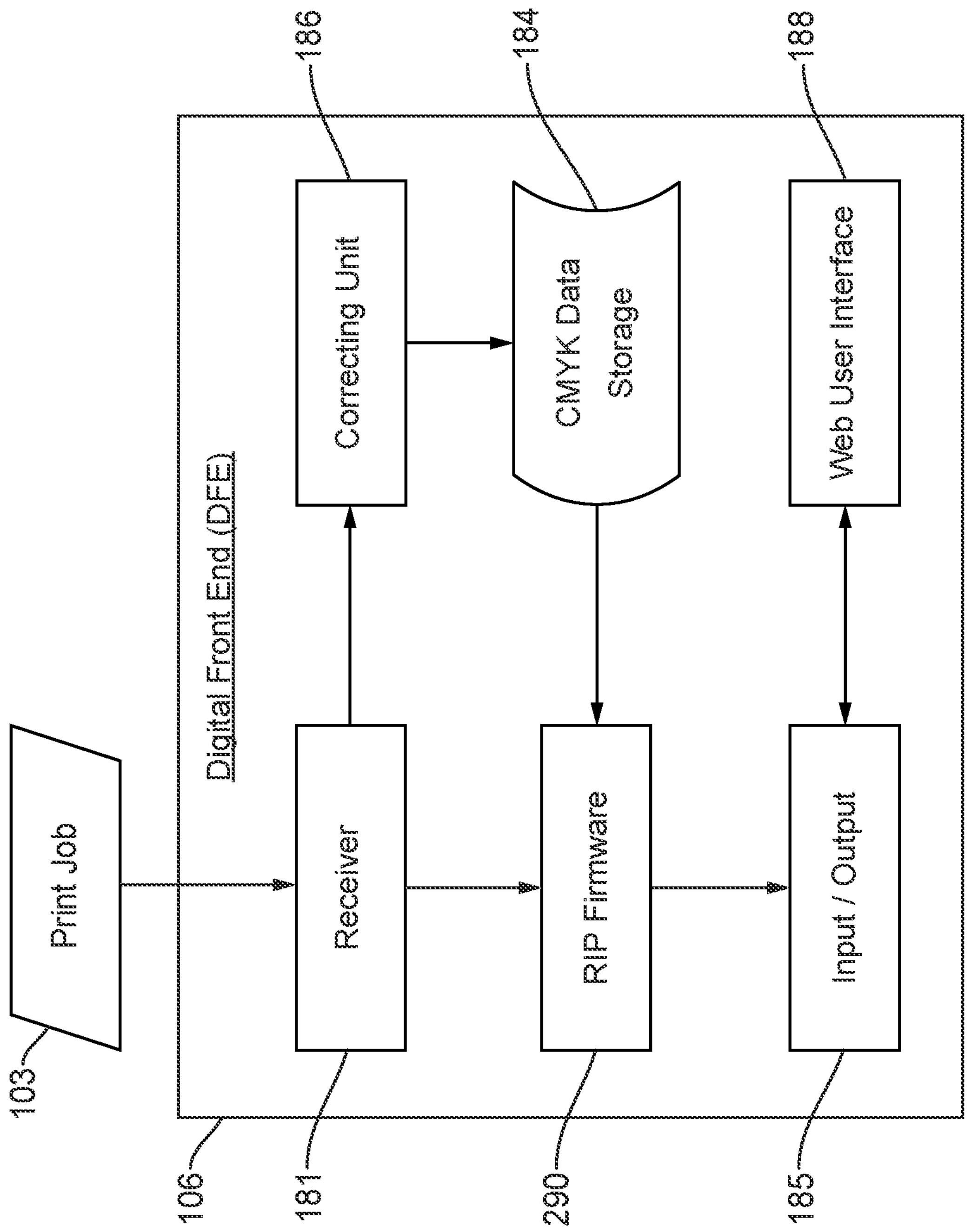
FIG. 1B illustrates a digital front end (DFE) for a printing device according to the disclosed embodiments.

DFE 106 may use RIP firmware 290, shown in FIG. 1B, to convert bitmap images, vector graphics, fonts, and the like associated with pages in print job 103 to bitmap/rasterized representations of the pages, such as C, M, Y, and K pixels. The sum of the values of pixels of a particular color in the rasterized pages can be proportional to the amount of consumables used by printing device 104 to print that color. RIP firmware 290 may rasterize pages of print job 103 according to various image rasterization settings. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Figure 2:
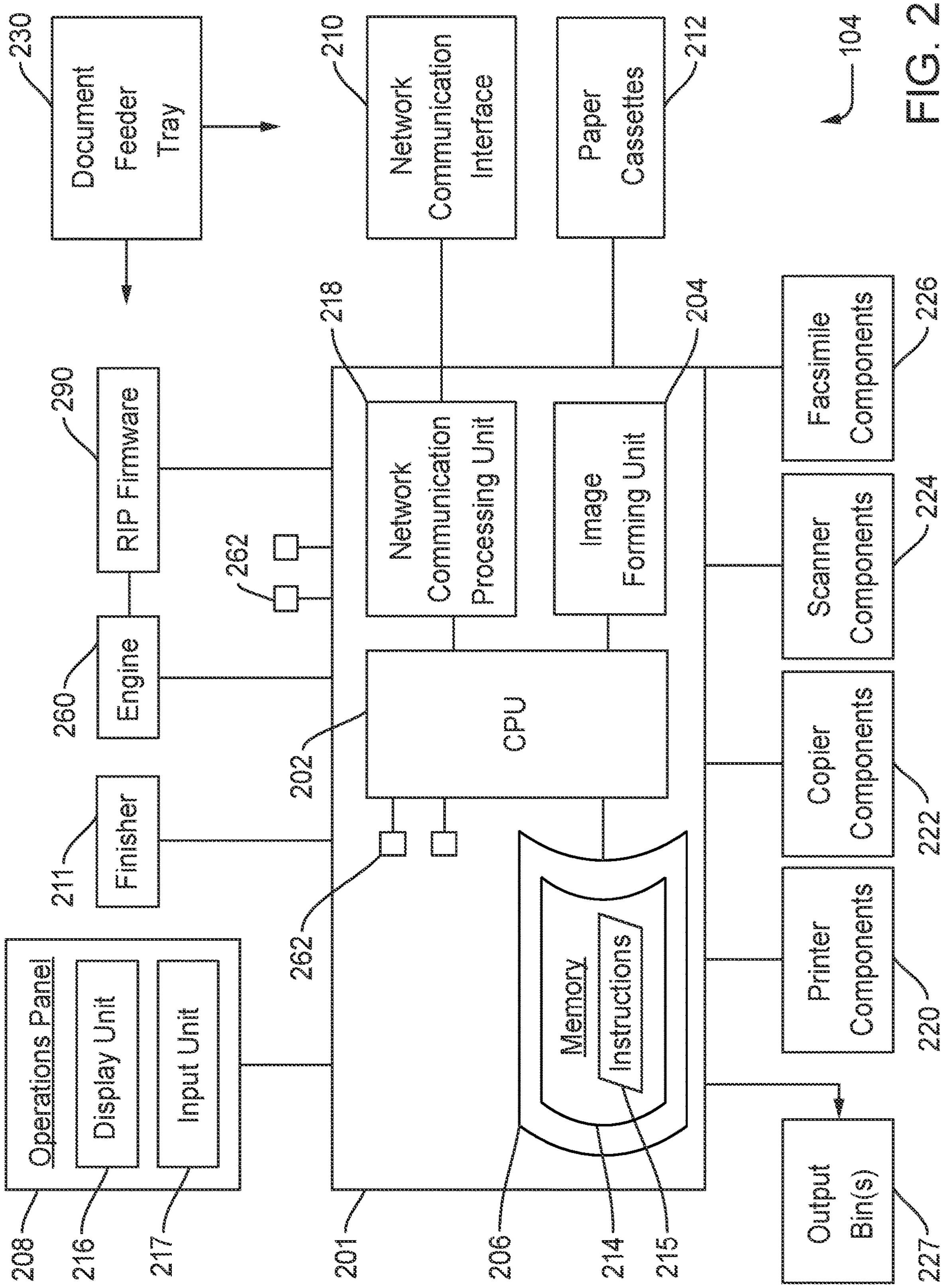
FIG. 2 illustrates a block diagram of components of the printing device for use within the printing system according to the disclosed embodiments.

Print engine 260, shown in FIG. 2, also is included within printing device 104. Printing device 104 may correspond to an industrial printing device capable of printing thousands of pages in an hour. Printing device 104 may be ink-based, toner-based, or both. Print engine 260 may include various parameters, shown as printing device configuration settings 130, which can control the operation of printing device 104, which impacts the amount of consumables required by the printing device. For example, these settings may include printing device maintenance settings that control or effect head cleaning intervals, head clogging prevention intervals, and the like of printing device 104. Referring back to FIG. 1A, printing device configuration settings 130 also may include spitting, or printing spray pattern over all content, the printing of purge sheets, the printing of spit lines, or lines printed between page frames in a roll-fed printing device to ensure that all jets of the print head fire when instructed.

As noted above, print job 103 may be created at client device 102. Print job 103 includes a print ticket 110. Print ticket 110 includes one or more job settings 112. Job settings 112 may relate to a property of print job 103, such as the number of sheets to be printed or whether print job 103 includes a cover. Job settings 112 include parameters for print job 103, such as the type of media or paper used, texture, hole type, finishing instructions, and the like. Jobs settings 112 each may have attributes associated therewith. For example, an attribute for a type of paper may be the weight of the paper. For a cover, an attribute may be the cover weight. Attributes also are related to constraints imposed by printing device 104 on print jobs.

Printing device 104 also includes finisher 211. Finisher 211 performs finishing actions specified by job settings 112 of print job 103. For example, finisher 211 may include a stapler 114 to staple the finished sheets and cover, if applicable, of print job 103. Punch 116 may punch holes in the finished sheets and cover, if applicable. These finishing operations and the availability thereof also may constrain certain features within print job 103.

FIG. 1B depicts a block diagram of DFE 106 according to the disclosed embodiments. DFE 106 includes a receiver 181, a RIP firmware 290, a CMYK data storage 184, an input/output connector 185, and a correcting unit 186. RIP firmware 290 also is disclosed in FIG. 2 and in greater detail in FIG. 3. Additional components within DFE 106 may be implemented, including those disclosed in FIG. 1A. DFE 106, therefore, includes data for job settings 126, DFE configuration settings 128, and, optionally, printing device configuration settings 130, even though these are not shown in FIG. 1B.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices, if it is located at a separate device, using, for example, input/output connector 185. Web user interface 188, or web application, allows a user of the DFEs of other printing devices to interact with content or software running on DFE 106.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from client device 102, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215.

Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from estimation system 108 as well as other printing devices within system 100.

Figure 3:
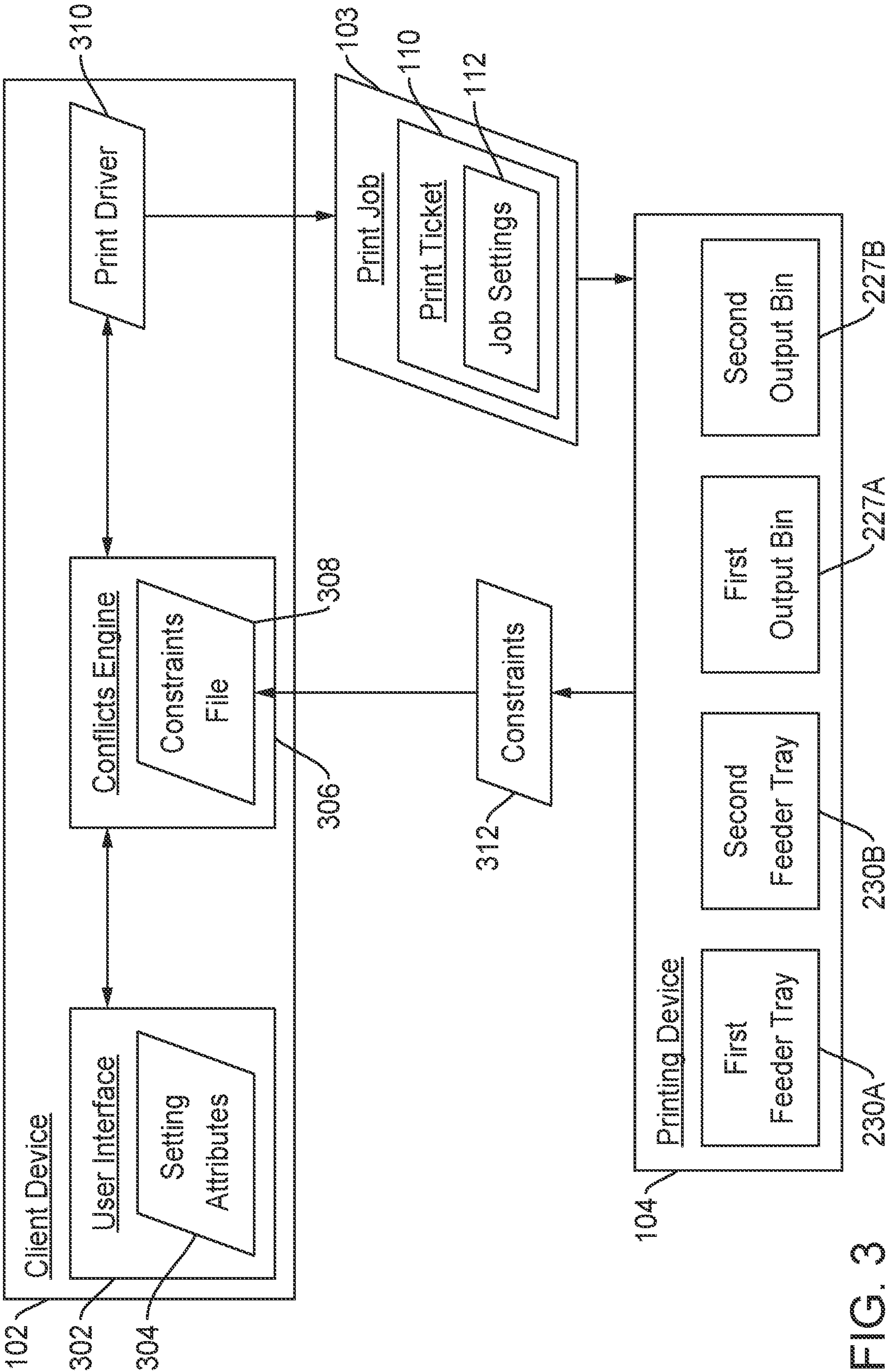
FIG. 3 illustrates a block diagram of applying constraints for generating a print job according to the disclosed embodiments.

FIG. 3 depicts a block diagram of applying constraints 312 to generate print job 103 according to the disclosed embodiments. Client device 102 may include user interface 302 that allows the operator to select job settings 112 for print job 103. User interface 302 may be displayed on a panel or screen at client device 102 and receives input to select settings attributes 304 available for printing documents at printing device 104. Attributes may be defined in greater detail below, but relate to job settings 112 included in print ticket 110.

As attributes are selected in user interface 302, conflicts engine 306 may check that selected setting attributes 304 do not violate constraints 312 set forth in printing device configuration settings 130 for printing device 104. For example, printing device 104 may impose constraints on the maximum number of sheets printed to output bin 227. Conflicts engine 306 includes a constraints file 308 that is derived from constraints 312 for printing operations at printing device 104. Constraints file 308 may be an Extensible Markup Language (XML) file that may include an XML Schema Definition (XSD) to define the elements and attributes that can appear in constraints file 308. Constraints file 308 may include multidimensional constraints, which result in a complex set of constraints 312.

Figure 4:
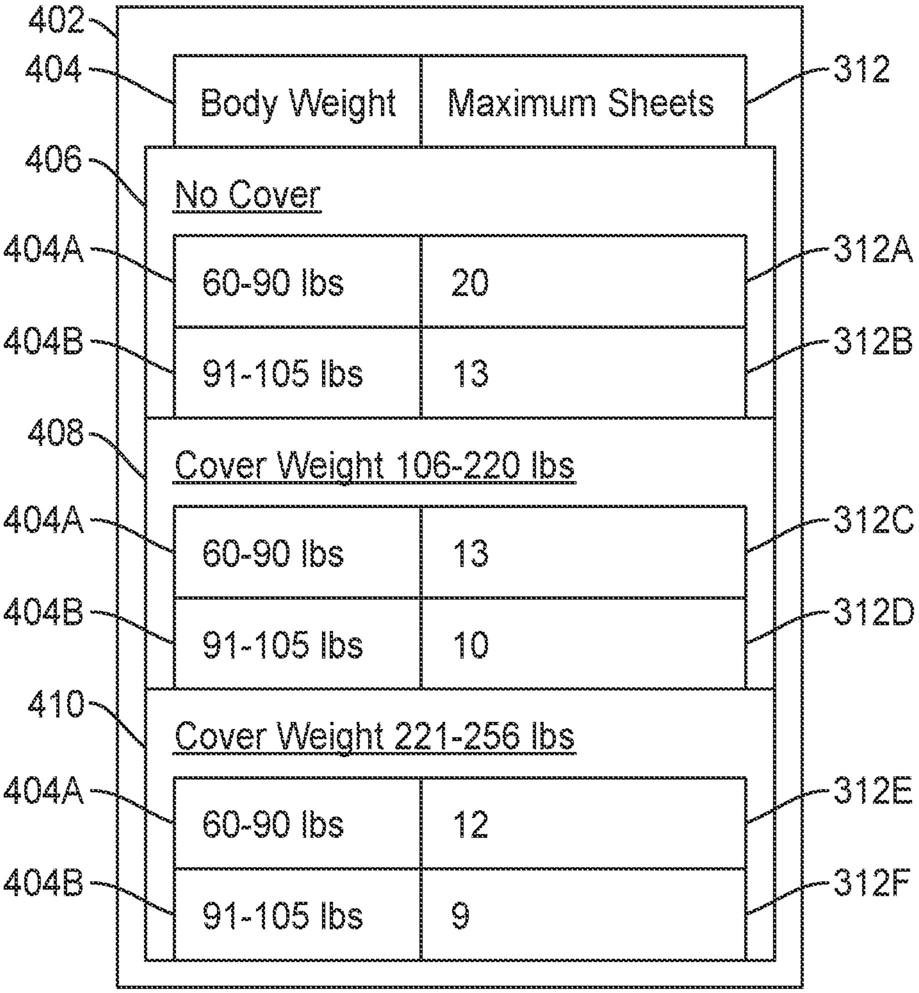
FIG. 4 illustrates a table showing relationships between attributes and constraints according to the disclosed embodiments.

Referring to FIG. 4, the relationship between body weight attributes 404 and constraints 312 for a maximum number of sheets may be shown. In addition, FIG. 4 includes a table 402 showing the relationship between attributes 404 for body weight of a paper specified in job settings 112 for print job 103 and attributes 406, 408, and 410 regarding having a cover to constraint 312 of the maximum number of sheets to be used in a booklet. The number of sheets to be used in a booklet for print job 103 may vary based on the attributes, which adjusts constraint 312.

For example, attribute 404 may relate to body weight of the paper. Attributes 406, 408, and 410 of attribute 404 may relate to the weight of the cover. Attribute 406 indicates that no cover is to be used with the booklet for print job 103 based on job settings 112. Attribute 404 may have parameters related to the different body weights available at printing device. Here, parameter 404A may be a body weight between 60-90 lbs and parameter 404B may be a body weight between 91-105 lbs. Thus, a booklet with attribute 406 and parameter 404A for attribute 404 has a constraint 312A of 20 maximum sheets. A booklet with attribute 406 and parameter 404B for attribute 404 has an adjusted constraint 312B of 13 maximum sheets. Adjusted constraint 312B is determined based on the relationship between attribute 404 and attribute 406.

Constraint 312 may be adjusted to different maximum sheet numbers based on other attributes. In continuation of the example above, attribute 408 is a cover weight of 106-220 lbs. For a parameter 404A of attribute 404, adjusted constraint 312C is 13 sheets, which is less that the 20 sheets for attribute 404 and parameter 404A of attribute 404. A cover reduces the number of sheets available to be placed in the booklet. For parameter 404B of attribute 404, constraint 312 is adjusted even further to adjusted constraint 312D of 10 maximum sheets. A heavier cover weight of 221-256 lbs for attribute 410 results in an adjusted constraint 312E of 12 maximum sheets for parameter 404A of attribute 404 and an adjusted constraint 312F of 9 maximum sheets for parameter 404B of attribute 404.

The disclosed embodiments account for these complex relationships in conflicts engine 306 so that it can notify the operator using user interface 302 that a conflict will occur using setting attributes. For example, the operator selects a paper having a 68 lb weight for attribute 404 and a cover weight of 120 lbs. Job settings 112 specify a booklet size of 18 sheets. This size does not violate constraint 312 of 20 maximum sheets but does conflict with adjusted constraint 312C of 13 sheets. User interface 302 alerts the operator that the print job cannot be processed using these settings.

Referring back to FIG. 3, client device 102 also includes print driver 310, which allows client device 102 to interact with printing device 104. It also converts data generated in an application at client device 102 into a printable format for printing device 104. Print driver 310 may incorporate conflicts engine 306 so that it can tell user interface 302 when a conflict exists and that printing device 104 will reject print job 103. The disclosed embodiments perform conflicts checks using constraints 312 from printing device 104 as well as attributes for job settings 112.

Constraints 312 on printing operations also may be implemented due to feeder trays and output bins at printing device 104. For example, the maximum number of sheets to be used in printing a booklet for print job 103 may be bounded by the type of feeder tray used to supply paper or media. If the feeder tray is limited to letter-sized paper, then it will not be able to provide A4 paper for a print job. An output bin may be limited in the number of printed sheets it can hold or finish for print job 103.

In FIG. 2, printing device 104 is shown having document feeder tray 230 and output bin 227. These may be expanded to include multiple feeder trays and output bins. Thus, FIG. 3 depicts first feeder tray 230A and second feeder tray 230B. It also depicts first output bin 227A and second output bin 227B. Constraints 312 are provided to constraints file 308 to further adjust a constraint based on the attributes related to use of the feeder trays and the output bins.

Instead of evaluating individual attributes as part of conflict checking, the disclosed embodiments evaluate two or more attributes or associated parameters against each other so the value of one attribute is used to bound the valid values for the other attributes. Using table 402 above, the disclosed embodiments reduce the maximum number of sheets for a booklet finishing operation based on the weight of the selected papers and whether a cover is used as well as a weight for the cover. The disclosed embodiments also may further adjust constraint 312 for the maximum number of sheets based on the paper dimensions.

The disclosed embodiments perform the conflict operations concurrently against a collection of attributes. For example, the disclosed embodiments may change the valid weight ranges, paper textures, paper coatings, and feeder trays based on the specified paper type. The disclosed embodiments may bound a value based on the union of restrictions from multiple values. For example, the disclosed embodiments may change the valid paper size range based on the media type, feeder tray, and the output bin.

The disclosed embodiments, therefore, evaluate constraint values that change sheet to sheet in order to adjust constraints. The disclosed embodiments also may apply constraints 312 based on the most restrictive value. For example, if print job 103 specifies 4 different papers with different weights, the disclosed embodiments adjust the finishing constraints to use the heaviest possible weight. Alternatively, the weights may be aggregated for all of the sheets in print job 103 and constraints 312 applied against the average weight for the overall print job. Further, constraints 312 may be adjusted based on the number of times that a constraint is found in print ticket 110. For example, the disclosed embodiments may adjust constraints 312 based on whether covers are defined as no cover, front cover, or front and back cover.

FIG. 5 depicts table 502 of a collection of attributes used in adjusting constraints 312 at printing device 104 according to the disclosed embodiments. Table 502 includes attributes that may apply to print job 103 and are set forth by job settings 112 in print ticket 110. Attribute 504 may relate to the media type to be printed at printing device 104. In addition to normal paper type, media type may include envelopes and labels. Further, paper media may come from first feeder tray 230A while other media types, such as tabs, envelopes, and labels, may come from second feeder tray 230B.

Attribute 506 may relate to front or back coating detail. This attribute also may be applied to adjust a constraint of constraints 312, such as maximum number of sheets.

Further, as can be seen in table 502, front or back coating detail is not available for tabs, envelopes, or labels. Attribute 508 may relate to a texture for the media selected to be printed. As shown in table 502, not every texture available for attribute 508 may be applied to each media type. In the instance of labels for attribute 504, no texture is available.

The disclosed embodiments also may include attributes that do not correspond to every parameter or variation of initial attributes, such as attribute 504 for media type. The disclosed embodiments will apply attributes incrementally to adjust constraints. For example, attribute 510 may relate to hole type that may be applied in a finishing operation. Thus, this may relate to which output bin is specified. For example, first output bin 227A may be available for punching operations, while second output bin 227B is not. Further, attribute 510 is not applicable to envelopes or labels as attribute 504. Attribute 512 may relate to set counts. For normal paper as attribute 504, attribute 512 does not really apply. Set counts, however, do apply to full cut tabs, envelopes, and labels. Thus, attribute 512 is applied to those media types as attribute 504. The disclosed embodiments will look to attributes 510 and 512 when the corresponding media type as attribute 504 is indicated in print ticket 110.

Figure 6A:
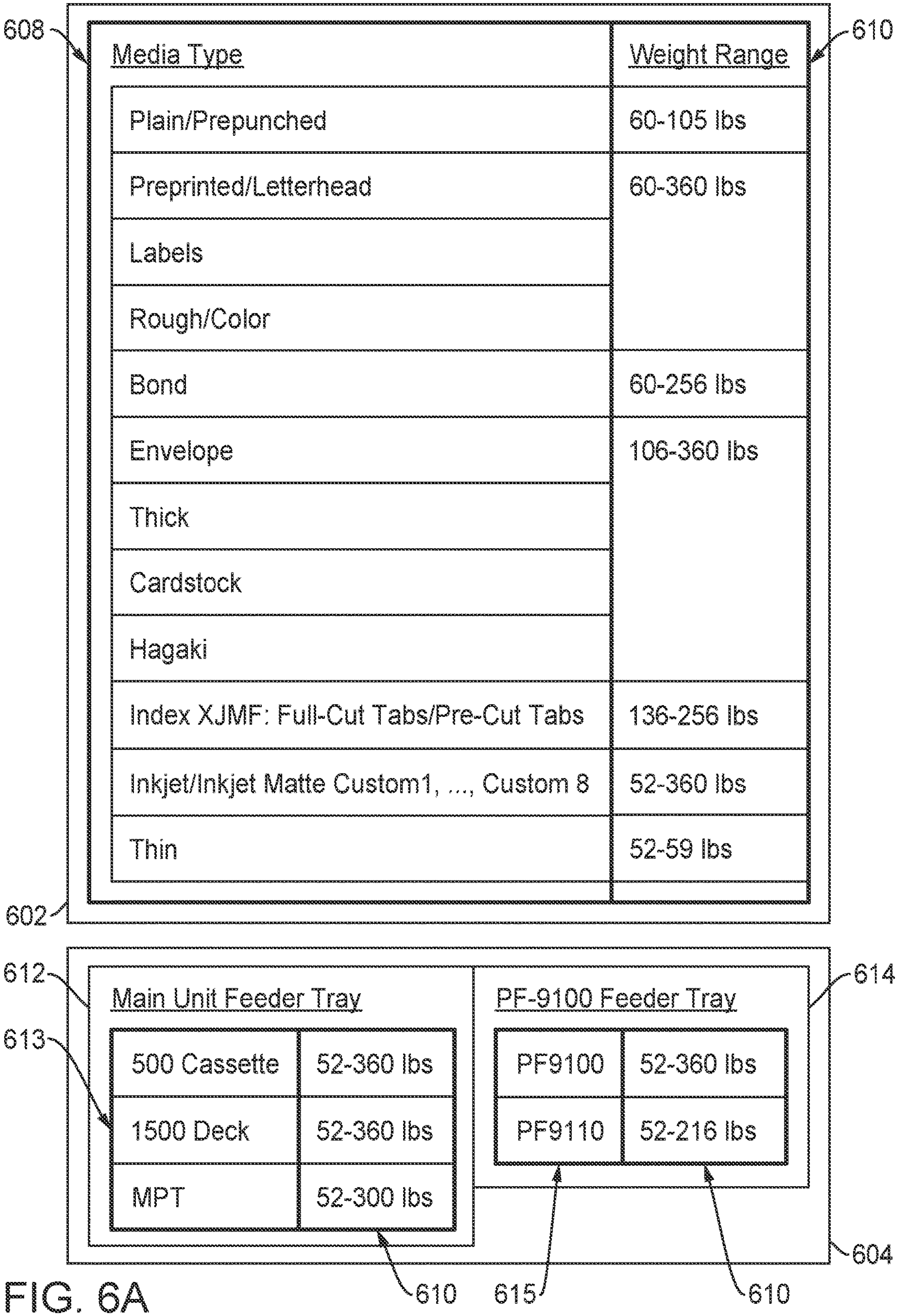
FIG. 6A illustrates tables showing multiple values for the constraints according to the disclosed embodiments.
Figure 6B:
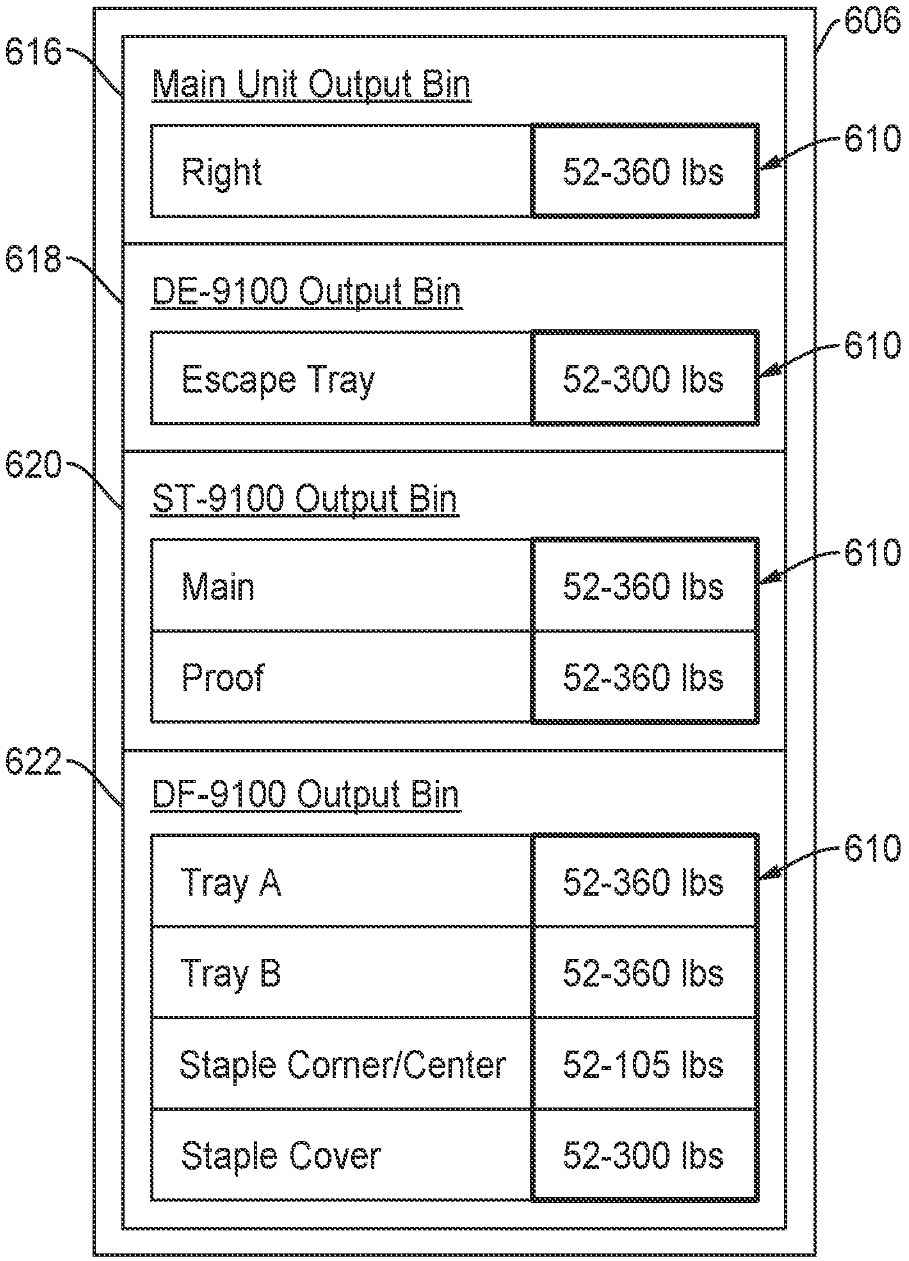
FIG. 6B further illustrates tables showing multiple values for constraints according to the disclosed embodiments.

FIGS. 6A and 6B depicts tables 602, 604, and 606 showing multiple values for constraints 312 according to the disclosed embodiments. Table 602 includes attribute 608 for media type. As shown, different media types have different weight ranges available for use at printing device 104, as attribute 610. Thus, the weight range for the selected media may be limited by attribute 610. For example, attribute 608 specifying thin media type with an attribute of 75 lbs for attribute 610 will cause a conflict. The disclosed embodiments may change the valid paper size range attribute 610 by media type attribute 608.

Multiple attributes may be applied in limiting other attributes. Referring to table 604, features related to feeder trays may be defined. Attributes may be defined for a main unit feeder tray 612. Attribute 613 may relate to the type of feeder tray used for main unit feeder tray 612. As shown, the type of feeder tray for attribute 613 adjusts valid paper size range, or weight range, attribute 610. An MPT is limited to a valid paper size range of 52-300 lbs as opposed to 52-360 lbs for a 500 cassette or 1500 deck feeder tray. The disclosed embodiments, therefore, further adjust attribute 610 for the weight range to 52-300 lbs based on the parameters applicable to attribute 613.

Printing device 104 may include a second feeder tray shown as PF-9100 feeder tray 614 in table 604. Attribute 615 may relate to the type of PF-9100 feeder tray used. As shown, attribute 615 also adjusts valid paper size range 610. If attribute 615 indicates a PF-9110 feeder tray, then attribute 610 is adjusted to a paper size range of 52-216.

Table 606 may define features related to output bins used at printing device 104. Like feeder trays, output bins may place constraints on what can be printed at printing device 104. Further, different output bins may limit what finishing operations can be performed. Table 606 defines main unit output bin 616, DE-9100 output bin 618, ST-9100 output bin 620, and DF-9100 622. As shown in table 606, each output bin has limits on weight range attribute 610. Output bin 616 appears to match the largest weight range attribute available at printing device 104, or 52-360 lbs. Output bin 618, however, limits attribute 610 to 52-300 lbs. Further, as shown with output bin 622, finishing operations for stapling may further limit attribute 610.

As can be appreciated, the disclosed embodiments may start with a constraint, such as maximum number of sheets, for printing device 104, then apply attributes and their associated parameters to further adjust the constraint. It may be performed in an incremental manner such to account for multiple attributes. For example, referring to tables 602, 604, and 606, print job 103 for labels as attribute 608 using feeder tray PF-9110 will limit weight range to 52-216 lbs while also not allowing for any front or back coating or detail according to table 502. One set may be printed as well. A print job outside of these constraints will be noted as conflicting according to constraints file 308. An alert is provided to the operator using user interface 302.

Figure 7:
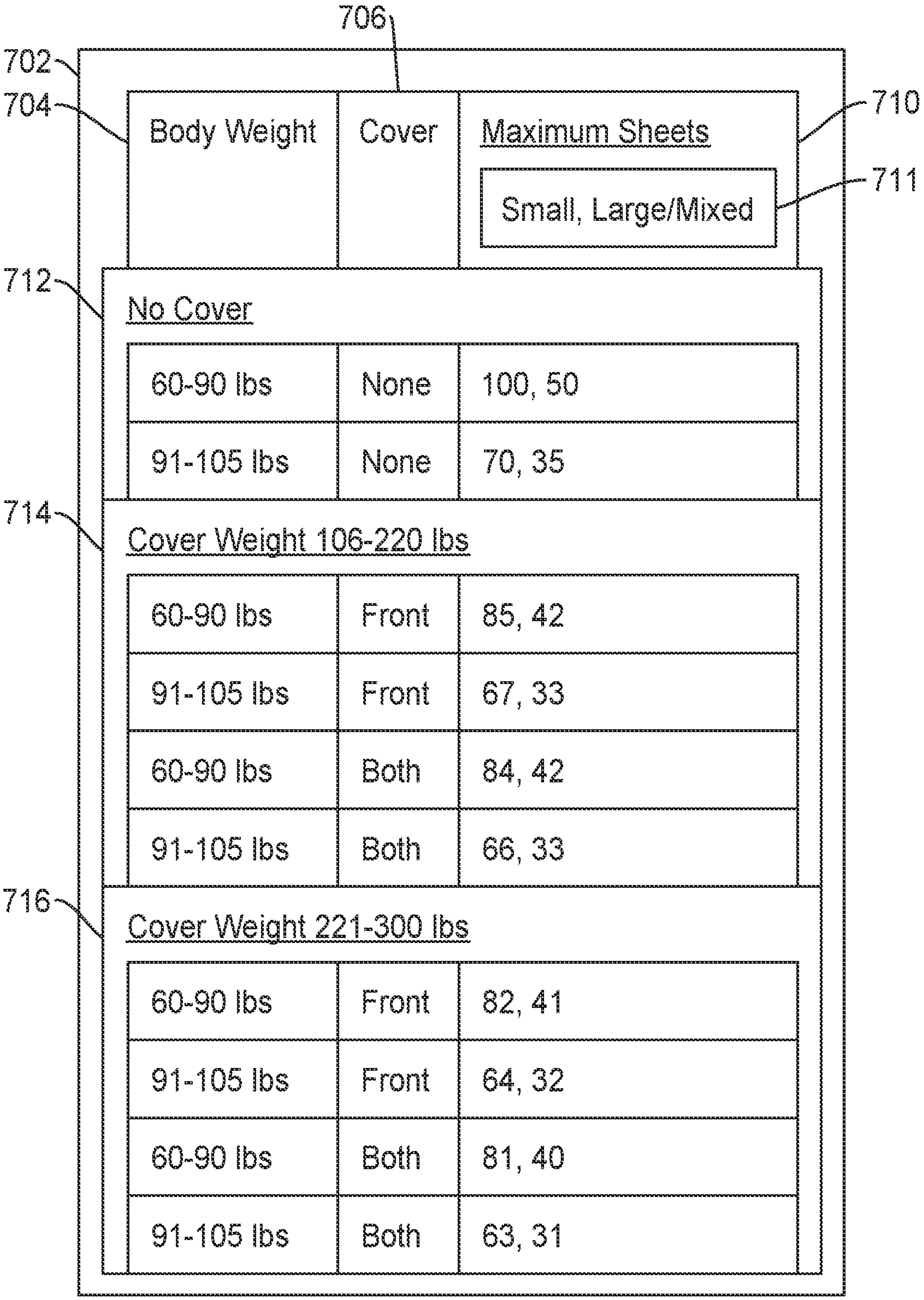
FIG. 7 illustrates a table for applying attributes to adjust a constraint according to the disclosed embodiments.

FIG. 7 depicts a table 702 for applying body weight attributes 704 and covers 706 to adjust a constraint 710 for the maximum number of sheets according to the disclosed embodiments. Table 702 may resemble FIG. 4 in that body weight attribute 702 is used to limit a constraint 710 for the maximum sheets that may be printed. Table 702 corresponds to constraints 710 on the maximum number of sheets that may be printed in a booklet that may or may not include one or more covers.

Body weight attribute 704 corresponds to attribute 404 in table 402, and may be broken down into parameters for 60-90 lbs weight and 91-105 lbs weight. Further, attribute 712 relates to no cover being used for a booklet for print job 103. According to table 702, parameters for attribute 704 may further adjust the maximum number of sheets. Further, within constraints 710, attribute 711 may indicate whether small sheets or large/mixed sheets are used in the booklet. Attribute 711 adjusts the maximum number of sheets based on sheet dimensions. A print job using an attribute 711 of small sheets with no cover allows for the highest maximum number of sheets according to table 702 of 100 sheets. Large sheets for attribute 711 adjusts this value to 50 sheets within the same parameter.

Mixed sheets for attribute 711 indicates that print job 103 includes a mixture of small sheets and large sheets. As disclosed above, the disclosed embodiments evaluates parameters for attributes that change sheet to sheet. In some embodiments, such as the one shown in table 702, constraints are adjusted to the most restrictive value. Here, constraint 710 is adjusted to use the large sheets, which results in a 50% reduction from the maximum number of sheets available for small sheets, or 50. For a body weight of 91-105 lbs, constraint 710 for large or mixed sheets is 35 sheets. This relationship may be seen with the other constraint values in table 702.

Attribute 714 relates to a cover having a cover weight between 106-220 lbs. Attribute 714 may be further broken down into booklets having a front cover and booklets having front and back covers. In short, having two covers will further limit the maximum number of sheets available to print a booklet using table 702 in conflicts file 308. Attribute 716 relates to a cover having a cover weight between 221-300 lbs. Attribute 716 also may be further broken down into booklets having a front cover and booklets having front and back covers. As can be seen, attribute 716 adjusts the maximum number of sheets even less that attribute 714. Thus, a booklet having two covers with a cover weight between 221-300 lbs and paper having a body weight between 91-105 will have the lowest value for the maximum number of sheets for constraints 710, or 31 sheets.

The disclosed embodiments also may account for sheets having different attributes. As noted above, a few different processes may be used. For example, one process may adjust constraints based on the most restrictive value. Using table 702, print job 103 may include several sheets having a body weight between 91-105 lbs so that the maximum number of sheets is adjusted to 70 sheets. Further, a few large sheets may be within print job 103 so that constraint 710 is adjusted even further to 35 sheets. Attribute 714 or 716 also may further limit the maximum number of sheets.

In other embodiments, the body weight parameters for all of the pages in print job 103 may be aggregated to determine an average weight. Thus, if print job 103 only includes a few pages having a body weight of 91-105 lbs, then the average weight for pages within the print job may still be below 90 lbs so that the maximum number of sheets is 100. The same process may be performed for small and large sheets for attribute 711.

Figure 8:
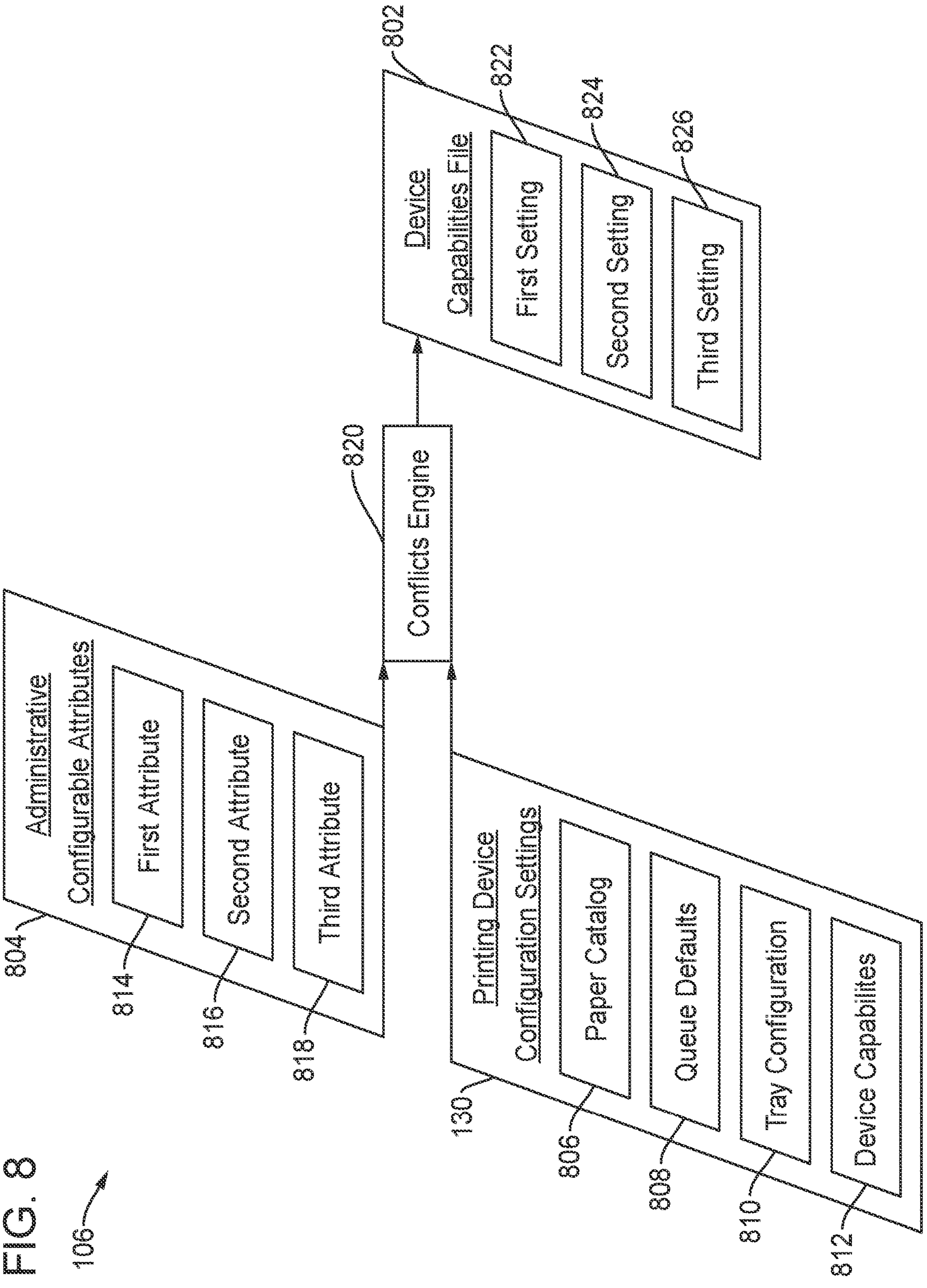
FIG. 8 illustrates a block diagram of a device capabilities file generated for a printing device using printing device configuration settings according to the disclosed embodiments.

FIG. 8 depicts a block diagram of a device capabilities file 802 generated for a printing device 104 using printing device configuration settings 130 according to the disclosed embodiments. The operations disclosed by FIG. 8 may occur in DFE 106 of printing device 104. DFE 106 may generate device capabilities file 802 that is used in later operations for conflict checking. Device capabilities file 802, however, first may include the settings for printing device 104. As shown, printing device configuration settings 130, disclosed above, may be provided along with administrative configurable attributes 804 to populate device capabilities file 802.

Printing device configuration settings 130 may include those settings and capabilities that printing device 104 could theoretically support. These may include conflicting capabilities. During startup of printing device 104, DFE 106 may determine the configuration of the printing device. For example, DFE 106 may determine which modules are installed and what options are configured for each module. Printing device 104 may have a punch module but the number of holes that can be punched varies depending on which die is installed in the punch.

As shown in FIG. 8, printing device configuration settings 130 includes paper catalog 806. Paper catalog 806 may provide an operator a centralized view of the available paper and media database to associate paper trays with the loaded media at print engine 260. Paper catalog 806 may show the proper color printing profile for the associated print media. Printing device configuration settings 130 also include queue defaults 808. Queue defaults 808 may relate to default settings for job queues in DFE 106. For example, a queue default for a job queue may be first in, first out. Another one may give priority to color print jobs. In short, queue defaults 808 may relate to how print jobs are processed within DFE 106.

Tray configuration 810 may relate to physical constraints applied to printing device 104 by the print trays. For example, the print trays may allow only printing of papers having a certain size, even though printing device 104 may process print jobs having a large variety of sizes. Device capabilities 812 may refer to finishing operations or other features that limit the capabilities of printing device 104. For example, printing device 104 may have two finishers that have different capabilities but one only of these finishers may be installed at a given time. Device capabilities 812 may provide information on both finishers and their capabilities and constraints.

Printing device configurations settings 130 may include additional settings, such as those disclosed in FIGS. 1A-7. In some embodiments, settings 130 may refer to paper types loaded or available on printing device 104. Although printing device 104 may print a variety of different types and sizes of media, DFE 106 may detect only certain papers available for a print job along with certain paper trays to handle these papers.

DFE 106 also may include administrative configurable attributes 804. Administrative configurable attributes 804 may refer to those attributes that are configured by an administrator and used by an operator. The operator cannot change the available values for the attributes. When the administrator defines the valid settings for printing device 104 using the attributes, the disclosed embodiments will add these to device capabilities file 802. Device capabilities file 802 is used to populate the print ticketing user interface, as disclosed below. To the operator, administrative configurable attributes 804 may look like a statically-defined set of value. These values, however, are configured uniquely for each printing device. The attributes are added to device capabilities file 802 as part of the configuration information provided by DFE 106.

Administrative configurable attributes 804, for example, may include first attribute 814, second attribute 816, and third attribute 818. Additional attributes may be included for administrative configurable attributes 804. For example, DFE 106 may store color adjustment presets that may be used to allow tweaking of the appearance of a print job. These presets may be adjustments to how the colors are reproduced. Using this example, first attribute 814 may adjust the hue while second attribute 816 may increase the contrast by a certain amount.

Several adjustment presets may be stored in administrative configurable attributes 804 for easy recall. The adjustments set forth by first attribute 814, second attribute 816, and third attribute 818 may be assigned to a customer or project by the administrator such that when DFE 106 receives a print job for the customer or project, administrative configurable attributes 804 are recalled. Administrative configurable attributes 804 also may be dynamic as disclosed above in that the administrator defines the valid values for the attributes for a given printing device.

Administrative configurable attributes 804 and printing device configuration settings 130 are used to generate device capabilities file 802. First, however, the disclosed embodiments may place these components through conflicts engine 820 within DFE 106. Conflicts engine 820 may operate similar to conflicts engine 306 disclosed above, except it is within DFE 106. Conflicts engine 820 may determine any conflicts between administrative configurable attributes 804, or their values, and printing device configuration settings 130. For example, first attribute 814 may adjust the hue for a customer's print jobs, but this adjustment may not be allowed according to the paper media within paper catalog 806. In another example, third attribute 818 may include values specifying that a three hole punch be used to finish print jobs for the customer but device capabilities 812 may specify that this finishing option is not available.

Conflicts engine 820 notes these conflicts in generating settings within device capabilities file 802. These relationships will be disclosed in greater detail below. Device capabilities file 802 includes a plurality of settings corresponding to printing device 104. First setting 822, second setting 824, and third setting 826 are shown. These settings may be used to populate the print ticket editor or user interface after received by print driver 310 at client device 102. Further, these settings may be further modified at client device 102 based on other attributes provided by the operator.

DFE 106 may make a copy of device capabilities file 802. It also may edit device capabilities file 802 to remove anything that is not relevant to the printing device as it is currently configured. For example, third setting 826 may be removed if it relates to color printing settings on a monochrome printing device. Further, in some embodiments, administrative configurable attributes 804 may not be provided to DFE 106. They may be provided at client device 102 or elsewhere within printing system 100. Alternatively, they may not be provided at all.

Figure 9:
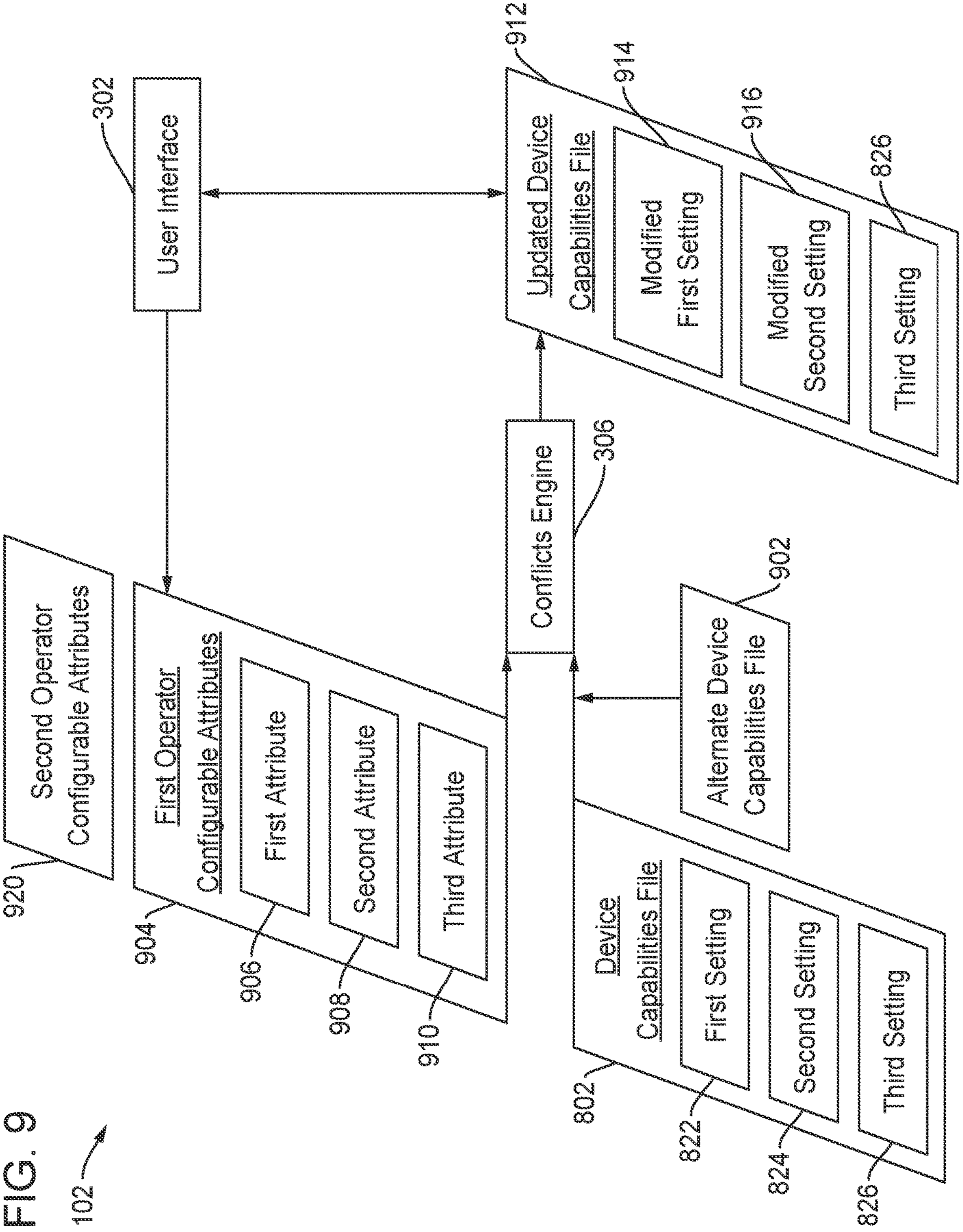
FIG. 9 illustrates a block diagram of a device capabilities file being received at a client device for further conflicts checking operations according to the disclosed embodiments.

FIG. 9 depicts a block diagram of device capabilities file 802 being received at client device 102 for further conflicts checking operations according to the disclosed embodiments. The operations disclosed by FIG. 9 also may take place in print driver 310. Device capabilities file 802 may be provided by DFE 106 of printing device 104. In some embodiments, when generating a print job, print driver 310 may download device capabilities file 802 from DFE 106 using a uniform resource locator (URL) corresponding to an internet protocol (IP) address.

As shown in FIG. 9, device capabilities file 802 may include first setting 822, second setting 824, and third setting 826 for print jobs at printing device 104. In some embodiments, these settings may correspond to a specific customer or project. Device capabilities file 802 may include any number of settings. Further, these settings may be modified by previously applied attributes and their values, such as administrative configurable attributes 804.

At client device 102, first operator configurable attributes 904 may be provided. Operator configurable attributes may be those attributes, such as a print condition, that are configured by an operator, user, or customer. These attributes may include new values that are added to device capabilities file 802. The operator also may remove attributes or values in the same manner.

A difference between first operator configurable attributes 904 and administrative configurable attributes 804 may be the need to monitor device capabilities file 802 for changes made to the settings due to the operator attributes. This monitoring may be performed by print driver 310, a print submission application, or the user interface for DFE 106. As shown in FIG. 9, conflicts engine 306 for print driver 310 may determine whether conflicts exist between first operator configurable attributes 904 and device capabilities file 802.

For example, first operator configurable attributes 904 includes first attribute 906, second attribute 908, and third attribute 910. These attributes may include adjustments to the values for attributes for settings at printing device 104. First operator configurable attributes 904 may include adjustment 1 for first attribute 906, adjustment 2 for second attribute 908, and adjustment 3 for third attribute 910. Conflicts engine 306 evaluates the attributes to ensure that they are a valid combination. Examples of combinations of settings and attributes are disclosed above.

As a result of this evaluation, updated device capabilities file 912 may be provided. For example, first attribute 906 may include a print condition for a specific paper used on printing device 104. Conflicts engine 306 may determine whether the print condition is valid in view of device capabilities file 802. If so, then a setting may be modified to include the print condition value specified by first attribute 906 to be included in updated device capabilities file. The print condition is specific to a customer for first operator configurable attributes 904. Thus, if first setting 822 pertains to the print conditions for the paper media, then updated device capabilities file 912 may include modified first setting 914 that includes this modification to the first setting.

Second attribute 908 may cause a modification to second setting 824 within device capabilities file 802. Thus, updated device capabilities file 912 may include a modified second setting 916 based on the evaluation by conflicts engine 306. For example, device capabilities file 802 may not allow the value set forth by second attribute 908. Thus, modified second setting 916 may indicate that the feature is not allowed and an error message provided. Third attribute 910 may not cause any change to third setting 826 such that it is not modified in updated device capabilities file 912. Third setting 826 is included in updated device capabilities file 912.

Updated device capabilities file 912 may be provided to user interface 302 of client device 102 to an operator looking to set print ticket settings, or setting attributes 304 for a print job. Print driver 310 and user interface 302 may retrieve updated device capabilities file 912 to populate user interface 302 with options or settings for a print job at printing device 104. The disclosed embodiments determine which print ticketing options should be enabled or disable. For example, color mode option is disabled for monochrome printing devices. The disclosed embodiments also determine what values should be available for print ticket settings. For example, the list of output bins is based on the installed output modules in printing device 104, as specified by printing device configuration settings 130. The disclosed embodiments also determine conflicts that are applicable per the device configuration. All of the above is loaded into user interface 302 so every time the operator changes the value of any setting, then user interface 302 checks for conflicts that involve that setting. For example, user interface 302 may generate another set of first operator configurable attributes 904 to be evaluated by conflicts engine 306.

The disclosed embodiments also may include an alternate device capabilities file 902 that is provided to client device 102 and conflicts engine 306. Alternate device capabilities file 902 may be provided by another DFE at another printing device within printing system 100. Alternate device capabilities file 902 may include different settings based on its configuration for the other printing device. It also may be evaluated by conflicts engine 306 in view of first operator configurable attributes 904 to provide its own device capabilities file to user interface 302. As print driver 310 pulls device capabilities files using URLs, a variety of printing devices having different files may be implemented using a single print driver.

The disclosed embodiments also may include second operator configurable attributes 920 that corresponds to another operator or customer and the associated attributes and values for that customer. In other words, the disclosed embodiments may have several, if not more, stored attributes for different operators or customers that are evaluated by conflicts engine 306. The print ticket settings presented by user interface 302 may change depending on the appropriate device capabilities file. The device capabilities files may be stored at client device 102.

Figure 10:
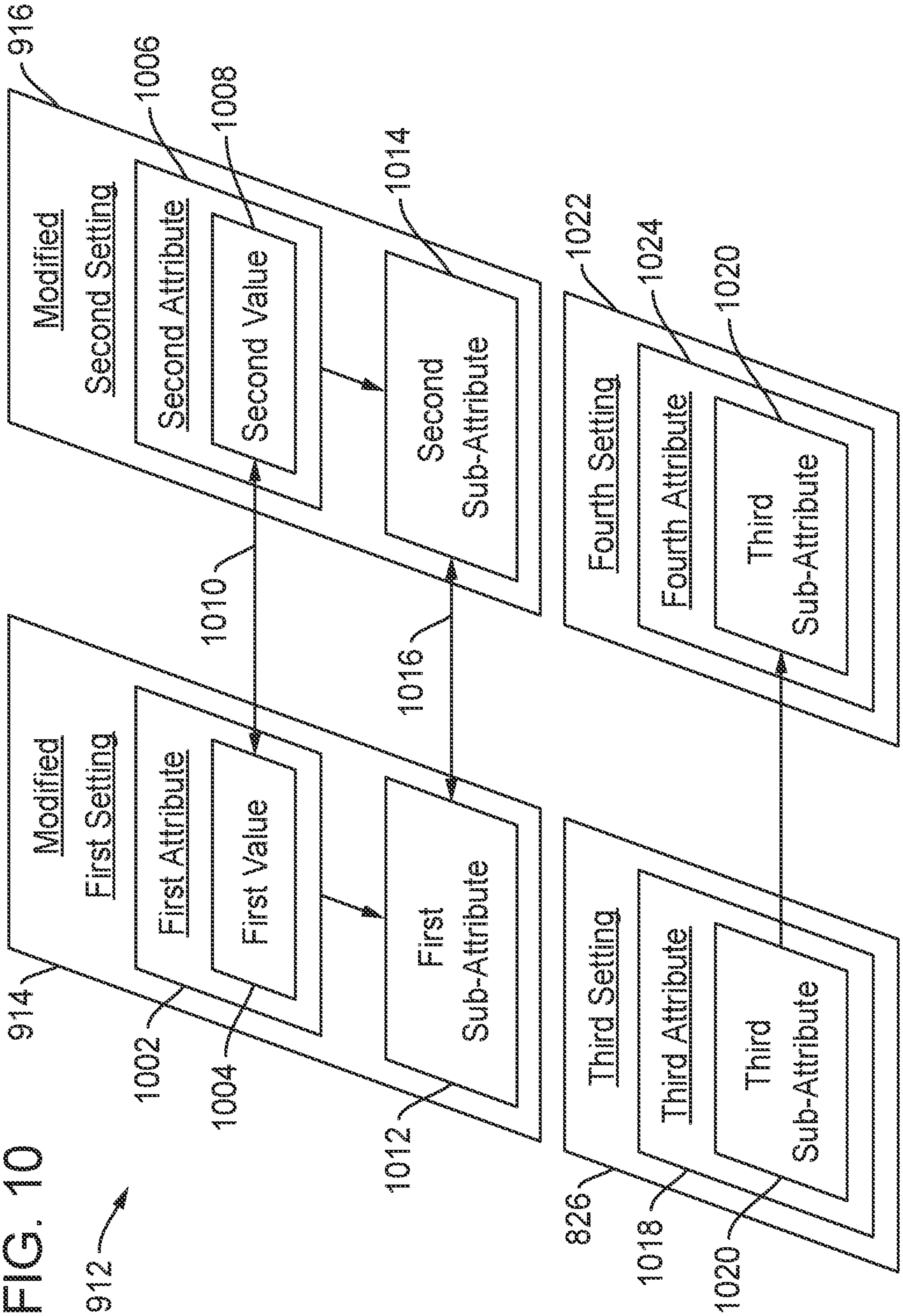
FIG. 10 illustrates a block diagram of settings, attributes, and values within an updated device capabilities file according to the disclosed embodiments.

FIG. 10 depicts a block diagram of settings, attributes, and values within updated device capabilities file 912 according to the disclosed embodiments. Multi-attribute conflicts may depend on the relevant configuration. As such, an operator may store settings with a dependency on another setting. The operator may define arbitrary values for one attribute in the context of a value for another attribute. These contexts would represent the valid combinations that would need to be dynamically added to the conflict checking configuration.

As shown in FIG. 10, modified first setting 914 may be a setting modified by the evaluation by conflicts engine 306 or 820. Modified first setting 914 may include first attribute 1002 having first value 1004. First attribute 1002 is dynamic as values may be defined by an administrator or operator, as disclosed above. For example, modified first setting 914 may relate to attributes for a finisher installed on printing device 104. First attribute 1002 may relate to the maximum number of sheets that the finisher can produce. First value 1004 may be that number, such as 100 sheets. The maximum number of sheets that printing device 104 can print without refill may be 200 sheets, as shown by second attribute 1006 of modified second setting 916. Due to the change of first value 1004, context 1010 defined by the disclosed embodiments will dynamically configure second value 1008 based on first value 1004.

In another example, modified second setting 916 may relate to an input tray for a specified media. The input tray may have a second attribute for the maximum number of sheets that may be supplied for a print job, as shown in second value 1008. For example, second value 1008 may be 50 sheets. First operator configurable attributes 904 may specify a desired finishing operation, such as stapling, with a maximum number of sheets of 100 sheets as first value 1004. During the conflicts checking, first value 1004 will be modified to 50 sheets using context 1010.

If a proposed change or value for an attribute is not available due to a conflict, then the disclosed embodiments may return an error message to the operator. The operator then may make further changes or new values for the attributes using user interface 302.

First attribute 1002 also may have a first sub-attribute that also is dependent on first value 1004. First sub-attribute 1012 may be defined in view of first value 1004 and modified accordingly according to the value. A sub-attribute may be a subset of different variations of an attribute for a setting for printing device 104. Further, first sub-attribute 1012 may be related to a second sub-attribute 1014 through context 1016 of second attribute 1006. Thus, when first sub-attribute 1012 is defined or modified, then second sub-attribute 1014 also is defined or modified based on the relationship between first attribute 1002 and second attribute 1006. The disclosed embodiments dynamically update these values, attributes, and sub-attributes based on the relationships defined in the device capabilities file.

Further, third setting 826 may be within updated device capabilities file 912. Third setting 826 is not modified. Third setting 826 includes third attribute 1018 having a third sub-attribute 1020. Fourth setting 1022 may be defined for device capabilities file 802 or updated device capabilities file 912. Fourth setting 1022 is dependent on third setting 826. It also includes fourth attribute 1024 that is defined by third attribute 1018. Thus, fourth attribute 1024 may incorporate third sub-attribute 1020 as a sub-attribute. These relationships may be used to determine a conflict if fourth setting 1022 is changed by an operator or administrative attribute. Fourth setting 1022 may not conflict with the requirements set forth by third sub-attribute 1020 of third setting 826.

Figure 11:
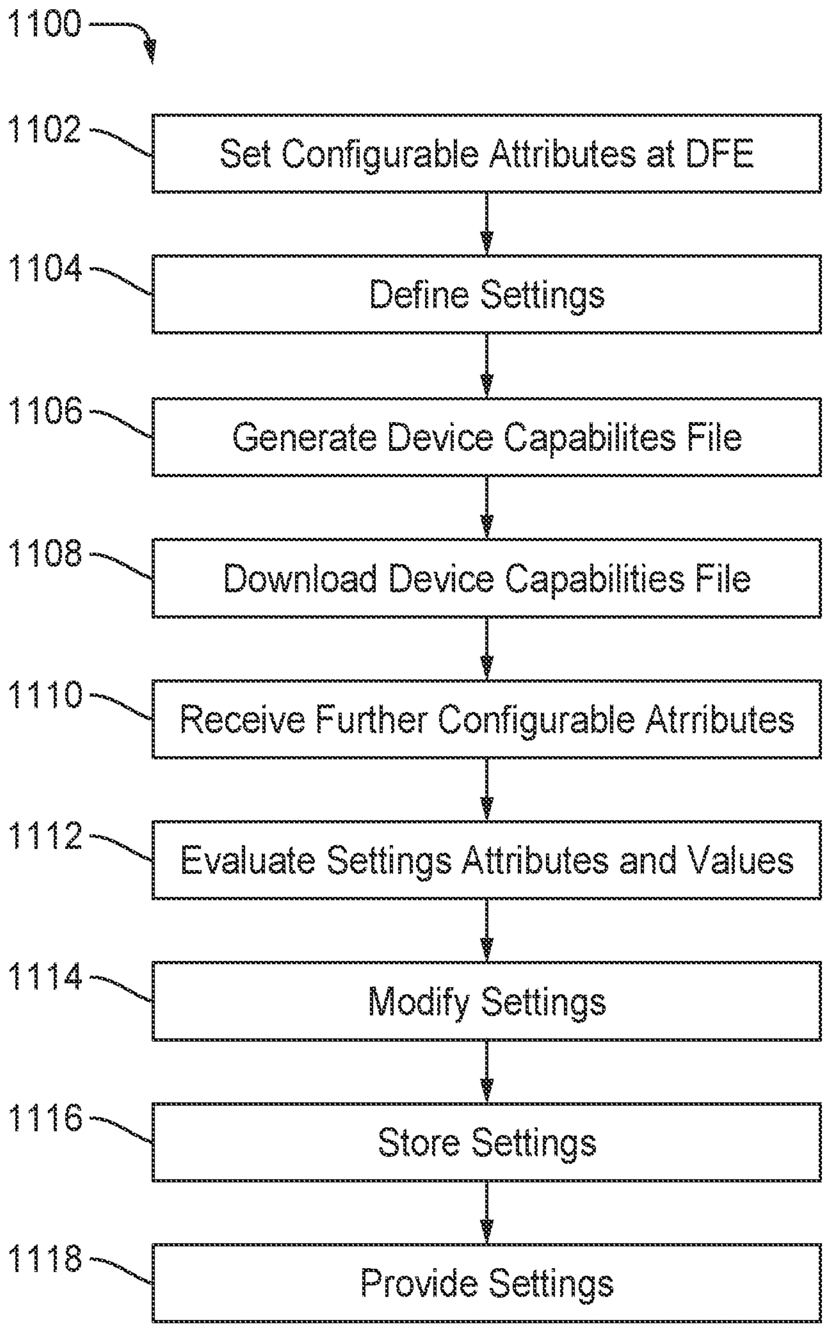
FIG. 11 illustrates a flowchart for dynamic conflict checking in printing operations according to the disclosed embodiments.

FIG. 11 depicts a flowchart 1100 for dynamic conflict checking in printing operations according to the disclosed embodiments. Flowchart 1100 may refer to FIGS. 1A-10 for illustrative purposes. Flowchart 1100, however, is not limited to the embodiments disclosed by FIGS. 1A-10.

Step 1102 executes by setting a plurality of configurable attributes relating to printing operations at DFE 106. DFE 106 may define attributes for capabilities and configurations as set forth in printing device configuration settings 130. These may be modified by administrative configurable attributes 804. Step 1104 executes by defining a plurality of settings for printing device 104 based on administrative configurable attributes 804. Step 1106 executes by generating device capabilities file 802 at DFE 106 having the plurality of settings as defined by the configurable attributes and configuration settings.

Step 1108 executes by downloading device capabilities file 802 to a client device 102, print driver 310, a printing application, or an interface at DFE 106. Device capabilities file 802 may be downloaded using a URL corresponding to an IP address of DFE 106 storing the device capabilities file for printing device 104. Step 1110 executes by receiving further configurable attributes, such as first operator configurable attributes 904, from an operator or a customer. First operator configurable attributes 904 may include values for settings that differ from the values for the settings within device capabilities file 802.

Step 1112 executes by evaluating the attributes and values for the settings using conflicts engine 306. In other embodiments, conflicts engine 820 in DFE 106 may be used. Conflicts engine 306 may compare values for attributes to the allowed values or constraints imposed by the configuration of printing device 104 as captured in device capabilities file 802. If there is a direct conflict, then the operator may be alerted. For example, a specified finishing operation may not be available at printing device 104.

Step 1114 executes by modifying the plurality of settings based on a conflict with at least one of the attributes. Examples of such conflicts are provided above. A value for an attribute for a setting may be modified due to the conflict such that the available print ticket settings will reflect the modified value of the attribute. Step 1116 executes by storing the plurality of settings in an updated device capabilities file 912. Updated device capabilities file 912 may be device capabilities file 802 with modified settings, attributes, or values. Step 1118 executes by providing the plurality of settings using updated device capabilities file 912 to a user interface 302 for a print driver 310, printing application, or the DFE user interface. The operator is presented with print ticket settings that reflect the configuration of printing device 104 along with requirements or specifications for the operator or a customer.

Preferably, the operator will not make settings that result in the print job being halted due to a conflict.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for dynamic conflict checking for printing operations, the method comprising:

setting a plurality of configurable attributes relating to printing operations at a digital front end (DFE) of a first printing device;

defining a first plurality of printing device configuration settings for the first printing device based on the plurality of configurable attributes, wherein the first plurality of printing device configuration settings relate to a print engine of the first printing device;

modifying the first plurality of printing device configuration settings based on a conflict with at least one of the plurality of configurable attributes determined by a conflicts engine within the DFE of the first printing device, wherein the conflict is determined locally at the DFE of the first printing device with the conflicts engine;

storing the first plurality of printing device configuration settings in a first device capabilities file at the DFE of the first printing device; and providing the first plurality of printing device configuration settings using the first device capabilities file during the printing operations at the first printing device.

2. The method of claim 1, wherein setting the plurality of configurable attributes includes setting the plurality of configurable attributes for at least one paper.

3. The method of claim 1, wherein modifying the plurality of configurable attributes includes modifying the plurality of configurable attributes related to print ticket settings.

4. The method of claim 1, wherein setting the plurality of configurable attributes includes setting the plurality of configurable attributes for queue defaults within the DFE.

5. The method of claim 1, wherein setting the plurality of configurable attributes includes setting the plurality of configurable attributes for at least one tray at the first printing device.

6. The method of claim 1, further comprising configuring the plurality of configurable attributes by an administrator.

7. The method of claim 1, further comprising downloading the first device capabilities file from the DFE of the first printing device using a uniform resource locator (URL) corresponding to an internet protocol (IP) address.

8. The method of claim 1, further comprising receiving a print condition for a print job generated by a printer driver in conjunction with the print ticket editor.

9. The method of claim 8, further comprising determining whether a print setting conflict exists between the print condition and the first plurality of printing device configuration settings.

10. A printing system comprising:

a first printing device including a first print engine;

a processor; and a memory storing instructions, wherein the instructions, when executed on the processor, configure the printing system to set a plurality of configurable attributes related to printing operations at the first printing device;

define a first plurality of printing device configuration settings for the first printing device based on the plurality of configurable attributes, wherein the first plurality of printing device configuration settings relate to the first print engine of the first printing device;

modify the first plurality of printing device configuration settings based on a conflict with at least one of the plurality of configurable attributes determined by a conflicts engine within the DFE of the first printing device, wherein the conflict is determined locally at the DFE of the first printing device with the conflicts engine;

store the first plurality of printing device configuration settings in a first device capabilities file at the DFE of the first printing device; and provide the first plurality of printing device configuration settings using the first device capabilities file during the printing operations at the first printing device.

11. The printing system of claim 10, further comprising a client device having a print ticket editor to receive the first device capabilities file.

12. The printing system of claim 10, further comprising a second printing device, wherein the second printing device includes a DFE, wherein the instructions further configure the printing system to set the plurality of configurable attributes related to printing operations at the second printing device having a second print engine;

define a second plurality of printing device configuration settings for the second printing device based on the plurality of configurable attributes, wherein the second plurality of printing device configuration settings relate to the second print engine of the second printing device;

modify the second plurality of printing device configuration settings for the second printing device based on the plurality of configurable attributes determined by a conflicts engine within the DFE of the second printing device, wherein the conflicts engine within the DFE of the second printing device is different from the conflicts engine within the DFE of the first printing device;

store the second plurality of printing device configuration settings in a second device capabilities file; and provide the second plurality of printing device configuration settings using the second device capabilities file during printing operations at the second printing device.

13. The printing system of claim 10, further comprising a digital front end (DFE) for the first printing device to generate the first device capabilities file.

* * * * *